United States Patent Office 3,706,704
Patented Dec. 19, 1972

3,706,704
PREPARATION OF C$_6$–C$_{10}$ OLEFIN-MALEIC ANHYDRIDE COPOLYMERS
Wililam J. Heilman, Allison Park, Pa., assignor to Gulf Research & Development Company, Pittsburgh, Pa.
No Drawing. Continuation-in-part of application Ser. No. 828,001, May 26, 1969, which is a continuation-in-part of application Ser. No. 594,347, Oct. 25, 1966. This application Nov. 27, 1970, Ser. No. 93,501
The portion of the term of the patent subsequent to May 25, 1988, has been disclaimed
Int. Cl. C08f 1/08, 15/02
U.S. Cl. 260—78.5 R                14 Claims

ABSTRACT OF THE DISCLOSURE

Copolymers of maleic anhydride and an aliphatic alpha-olefin having from six to ten carbon atoms are prepared in a finely divided filterable solid form. Maleic anhydride is copolymerized with at least one of the olefins in the presence of a free-radical catalyst and a solvent for both of the monomers and the resulting copolymer. The copolymer is precipitated by adding the reaction solution to a sufficient amount of a monohydroxy aliphatic alcohol having from one to four carbon atoms.

This application is a continuation-in-part of my copending Ser. No. 828,001, filed May 26, 1969, now Pat. No. 3,580,893, which is in turn a continuation-in-part of my copending Ser. No. 594,347, filed Oct. 25, 1966, now abandoned.

This invention relates to a method for the preparation of alpha-olefin-maleic anhydride copolymers wherein the alpha-olefin has from six to ten carbon atoms.

Nicholls et al. in U.S. Pat. No. 3,318,851 describe the preparation of copolymers of maleic anhydride and olefins having the formula:

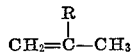

where R is a straight chain alkyl group containing from two to six carbon atoms. Nicholls et al.'s method involves the use of solvents wherein the copolymers precipitate as formed. U.S. Pat No. 3,461,108 to Heilman et al. relates to the preparation of copolymers of maleic anhydride and an aliphatic olefin having six carbon atoms, such as 1-hexene. The invention in Pat. 3,461,108 resides in a finding that if the copolymer is prepared by solution polymerization using a very specific solvent, namely a saturated dihalogenated aliphatic liquid hydrocarbon having from one to five carbon atoms, then the copolymer can be precipitated in a filterable particulate solid form by admixing the copolymer while in solution with any non-solvent for the copolymers. Among the non-solvents are saturated hydrocarbons such as heptane and olefinic hydrocarbons. The use of methanol and other alcohols to precipitate the copolymers is also taught, but it is indicated the resulting product is contaminated with a half-ester due to the reaction of the alcohol with the anhydride groupings of the copolymer. Thus one with ordinary skill in the art would tend to avoid the use of alcohols as non-solvents due to the formation of the half-ester. Further, Pat. 3,461,108 shows in its working examples that pentene-1 (Example 21) and decene-1 (Example 22) do not precipitate out in a finely divided filterable solid form using the same method which performs well for the olefins having six carbon atoms per molecule. The teachings in Pat. 3,461,108 are therefore relatively restricted with respect to the charge stock (an olefin having six carbon atoms per molecule) and a narrowly defined type of solvent which must be employed to maintain the copolymers in solution. Provided the olefin has six carbon atoms per molecule and further provided the solvent is a saturated dihalogenated aliphatic hydrocarbon having from one to five carbon atoms, then and only then can the copolymers of the olefin with maleic anhydride be precipitated out in a finely divided filterable solid form by admixing the polymer solution with any non-solvent.

It would be highly desirable to have more versatility in the type of solvents which can be employed for the preparation of aliphatic olefin-maleic anhydride copolymers. It has now been found that aliphatic olefin-maleic anhydride copolymers wherein the olefin has from six to ten carbon atoms per molecule can suitably preprepared in any solvent and can then be precipitated out in a finely divided filterable solid form so long as the non-solvent which is employed is a monohydroxy aliphatic alcohol having from one to four carbon atoms.

This discovery now gives those in the art a versatility in choosing whatever solvent they may desire for the preparation of C$_6$ to C$_{10}$ olefin-maleic anhydride copolymers so long as, of course, the non-solvent which is employed is a monohydroxy aliphatic alcohol having from one to four carbon atoms.

While it is true that the use of an alcohol as a non-solvent results in contamination of the product with half-ester due to the reaction of the alcohol with the anhydride groups of the copolymer, the amount of contamination is relatively small provided increased temperatures or long contact times are not employed. The resulting product fortuitously can be purified of its half-ester content by simply heating the resulting copolymer at a temperature above 80° C. under vacuum in accordance with the teachings of the parent Ser. No. 828,001. As an additional advantage, the alcohol readily dissolves any unreacted maleic anhydride which may be present in the copolymer and thus tends to increase its purity.

The olefin charge stock employed in the process of this invention can be a single olefin or a mixture of two or more olefins having from six to ten carbon atoms per molecule. The preferred olefins are the alpha-olefins having the formula:

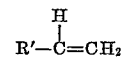

where R' can be a hydrocarbon radical having from four to eight carbon atoms.

It is understood the term "olefin" is meant to include mixtures of monoolefins having from six to ten carbon atoms per molecule such as those obtained by the thermal or catalytic cracking of petroleum stocks. It is desirable that only one olefinic bond per molecule be present in the olefin. Minor amounts of diolefins, on the order of two percent or less, can, however, be tolerated in the olefin.

Examples of olefin compounds or mixtures of olefins suitable as co-monomers include:

| | |
|---|---|
| 1-hexene; | 3-hexene; |
| 4-methyl-1-pentene; | 1-heptene; |
| 3-ethyl-2-pentene; | 3,3-dimethyl-1-pentene; |
| 1-octene; | 2-methyl-1-heptene; |
| 3,3-dimethyl-1-hexene; | 1-nonene; |
| 4-nonene; | 4,4-dimethyl-1-heptene; |
| 1-decene; | 2-decene. |

The copolymerization can be conducted in any suitable manner. One suitable copolymerization procedure involves contacting the olefinic compound with the maleic anhydride in a suitable solvent in the presence of a free-radical producing catalyst, such as a peroxide. The molar ratio of the olefinic compound to the maleic anhydride can vary over a wide range, but is generally between about 1:1 and 5:1, with preferred ranges between 1:1 and 3:1. The particularly preferred molar ratio of olefin to anhydride compound will depend to a large extent on the specific olefins employed.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents such as halogens, etc. The most preferred peroxides are the diaroyl and diacyl peroxides.

Examples of suitable peroxides, which in no way are limiting, include benzoyl peroxide; lauroyl peroxide; tertiary butyl peroxide; 2,4-dichlorobenzyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azobisisobutyronitrile, are also well-known free-radical promoting materials. These azo compounds can be defined as those having present in the molecule group —N=N—; wherein the valences are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and the phenyldiazonium halides. A suitable list of azotype compounds can be found in U.S. Pat. No. 2,551,813, issued May 8, 1951 to Paul Pinkney.

The amount of initiator to employ, exclusive of radiation, of course, depends to a large extent on the particular initiator chosen, the olefinic charge stock and the reaction conditions. The initiator must, of course, be soluble in the reaction medium. The usual concentrations of initiator are between 0.001:1 and 0.1:1 moles of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C., with preferred temperatures between 50° C. and 120° C.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The reaction time is usually sufficient to result in the substantially complete conversion of the maleic anhydride monomer to copolymer. The reaction time is suitably between one and 24 hours, with preferred reaction times between two and ten hours.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomer so as to bring them into intimate contact in the solution polymerization reaction. It has been found that the solvent must also be one in which the resultant copolymers are soluble, but not so soluble that the copolymers cannot be precipitated out of solution by the addition of a non-solvent for the copolymers.

Suitable solvents include liquid saturated or aromatic hydrocarbons having from six to 20 carbon atoms; ketones having from three to five carbon atoms; and liquid saturated aliphatic dihalogenated hydrocarbons having from one to five carbon atoms per molecule, preferably from one to three carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the ketones having from three to six carbon atoms and the saturated dichlorinated hydrocarbons having from one to five, more preferably one to three, carbon atoms.

Examples of suitable solvents include, but are not limited to:

(1) ketones, such as:
   acetone;
   methylethylketone;
   diethylketone; and
   methylisobutylketone
(2) aromatic hydrocarbons, such as:
   benzene;
   xylene; and
   toluene
(3) saturated dihalogenated hydrocarbons, such as:
   dichloromethane;
   dibromomethane;
   1-bromo-2-chloroethane;
   1,1-dibromoethane;
   1,1-dichloroethane;
   1,2-dichloroethane;
   1,3-dibromopropane;
   1,2-dibromopropane;
   1,2-dibromo-2-methylpropane;
   1,2-dichloropropane;
   1,1-dichloropropane;
   1,3-dichloropropane;
   1-bromo-2-chloropropane;
   1,2-dichlorobutane;
   1,5-dibromopentane; and
   1,5-dichloropentane
or (4) mixtures of the above, such as:
   benzene-methylethylketone.

The molecular weight of the polyanhydride component of the compositions of this invention can vary over a wide range. The inherent viscosity (which is a measure of molecular weight) of five grams of the polyanhydride per deciliter of acetone at 77° F. can suitably be between about 0.05 and 1.5 deciliters per gram and is usually from 0.06 to 0.08 deciliter per gram.

After copolymerization of the maleic anhydride and the alpha-olefin by solution polymerization as defined above, the reaction mixture comprising the copolymer, any unreacted monomers and the solvent is then added to a liquid monohydroxy alcohol having from one to four, preferably from one to three, carbon atoms at a rate such that the copolymer precipitates in a particulate filterable solid form.

Suitable alcohols which function as a non- or anti-solvent for the copolymer include methanol; ethanol; n-propanol; isopropanol; and n-butanol. The preferred alcohols are methanol, ethanol and the propanols.

It is preferable to remove any excess solvent before adding the reaction mixture to the alcohol since increased amounts of solvent merely require the use of increased amounts of alcohol to result in the precipitation of the copolymers. Usually the weight ratio of alcohol to solvent exceeds about 1:1 and is preferably in excess of 2:1. Usually a weight ratio of alcohol to solvent of about 4:1 is used, although ratios of 10:1 to 100:1 or more can be employed if desired. Of course, the initial ratio of alcohol to solvent may be very high if a batch precipitation is used wherein the solvent mixture is added to a large volume of alcohol. A continuous precipitation system can also be employed where a stream of alcohol and a stream of solvent reaction product are simultaneously admitted to a precipitation hold tank in the proper ratios and product is continuously removed.

The usual procedure is to admix the total reaction mixture from the polymerization reactor, including the solvent, copolymer, any unreacted monomers and initiator with the non-solvent by pouring and adding the total reaction mixture to the non-solvent at such a rate that the copolymer forms a fine particulate solid suitable for separation by filtration or centrifugation. If the opposite procedure is employed, namely, if the non-solvent is added to the total reaction mixture, the copolymer will tend to precipitate in larger size pieces which are not desirable. The non-solvent is preferably stirred well during the addition of the total reaction mixture. It is also preferred to add the hot reaction mixture at a temperature of between 50° C. and 95° C. to a cool non-solvent at a temperature between 20° C. and 50° C. Thus, the reaction mixture need not be cooled before addition to the non-solvent, and the addition of the hot reaction mixture to the cool non-solvent appears to aid in the formation of the finely divided particulate solid copolymer which is easily separable by filtration or centrifugation.

After the addition of the total reaction mixture to the non-solvent and the precipitation of the particulate solid copolymer, the copolymer is separated from the other components by any suitable means, such as by filtration or centrifugation. By following the process of this invention and using the defined solvent-non-solvent combinations, the copolymers are obtained in an easily filterable particulate solid form which has many advantages from the standpoint of ease of drying and handling. After separation of the copolymer solids, the remaining components can be separated by fractionation to recover the solvent, non-solvent and unreacted monomers for recycle. It is, therefore, also preferred to employ a particular solvent-non-solvent combination which is easy to separate by distillation.

The copolymer can be washed with any suitable liquid which can dissolve and thus remove any unreacted monomers. The solvent used in the reaction is suitable, as are added amounts of the non-solvent. The wash liquid is preferably heated to aid in the washing procedure. While the copolymer may be soluble in the wash liquid, the rate of solution of the copolymer is so much slower than the rate of solution of the monomers that very little of the copolymer is dissolved in the wash liquid. The copolymer can then be dried by any conventional drying procedure to remove any residual solvent and/or washing liquids.

The copolymer, after separation from the bulk of the alcohol, can easily be converted to a substantially pure polyanhydride by heating the polyanhydride containing small amounts of half-ester at a temperature greater than about 80° C. while continuously removing the alcohol as formed until an amount of alcohol has been recovered corresponding to the amount of half-ester groups in the copolymer. The copolymer can be analyzed beforehand by any suitable means, such as infrared or nuclear magnetic resonance, to determine the mole percent of the total carbonyl content

of the copolymer which is present in the form of acid

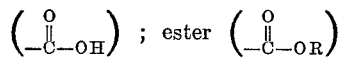

and anhydride

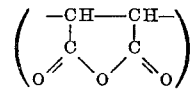

groups. The method of this invention is therefore particularly applicable as a method of purifying an alpha-olefin-maleic anhydride copolymer containing a small percentage, usually on the order of 0.5 to 20 percent, of the anhydride groups as randomly distributed half-ester groups, that is, about 0.5 to 20 mole percent of the total carbonyl content of the copolymer is present as ester groupings.

The invention will be further described with reference to the following experimental work.

EXAMPLE 1

In the run for this example, 196 grams (2 moles) of maleic anhydride; 168 grams (2 moles) of hexene-1; 400 milliliters of propylene dichloride; and 4.8 grams (0.02 mole) of benzoyl peroxide were refluxed at 77° C. to 80° C. for eight hours. The resulting viscous solution was poured into methanol (2 liters) and a solid copolymer was precipitated. The precipitate was separated by filtration and dried at room temperature for 24 hours. By "dry" is meant that there is less than two weight percent physically bound alcohol present. The dilute solution viscosity of the copolymer was 0.12. Analysis of the dry solid by infrared analysis showed that about five mole percent of the total carbonyl content of the copolymer was present in the form of ester groupings.

The copolymer was then heated in a vacuum oven (1 mm. of Hg) at 100° C. for 24 hours. The weight of the final copolymer after heating at 100° C. was 296.8 grams, representing an 8.15 percent conversion of the maleic anhydride to the desired copolymer. No carbonyl in the form of ester groupings was detected in the final product by quantitative infrared analysis.

A series of runs was made similar to Example 1 except in place of the propylene dichloride the solvent employed was either methylisobutylketone; chloroform; hexene-1 or benzene. Substantially the same results were obtained.

A series of runs was made similar to Example 1 except isopropanol was used in place of methanol and the solvent employed in place of propylene dichloride was either methylethylketone; a mixture of methylethylketone and benzene; methylisobutylketone or acetone. Substantially the same results were obtained.

A 1-octene-maleic anhydride copolymer was prepared as follows:

392 grams (4.0 moles) of maleic anhydride;
875 grams (7.8 moles) of 1-octene;
2000 milliliters of propylene dichloride; and
9.68 grams (0.04 mole) of benzoyl peroxide were refluxed at 77° C. to 80° C. for eight hours.

A series of runs was made by pouring six grams of the viscous polymer solution into a series of alcohols having from one to four carbon atoms, i.e., methanol, ethanol, n-propanol and n-butanol. The alcohol to reaction product solution weight ratios were varied from 1:2 to 4:1. The results of this series of runs are shown on Table I below.

TABLE I

| Example No. | Carbon No. of alcohol | Weight ratio of alcohol to solution of 1-octene-maleic anhydride copolymer in propylene dichloride | | | |
|---|---|---|---|---|---|
| | | 1:2 | 1:1 | 2:1 | 4:1 |
| 2 | $C_1$ | Gel | Sticky | [1] 100 | [1] 100 |
| 3 | $C_2$ | Sticky | [1] 97 | | [1] 100 |
| 4 | $C_3$ | Gel | [1] 100 | [1] 103 | [1] 100 |
| 5 | $C_4$ | Gel | [1] 91 | [1] 90 | [1] 87 |

[1] Percent recovery of copolymer as a finely divided filterable solid.

EXAMPLE 6

In the run for this example, 24 liters of 1,1-dichloroethane were admixed with 36.3 liters of 1-decene; 9.408 grams of maleic anhydride and 232.3 grams of benzoyl peroxide and heated to 198° C. for four hours. The product was poured into 55 gallons of isopropanol where a precipitate formed. The precipitate was filtered and dried in a vacuum at 50° C. The inherent viscosity of the product was 0.11 deciliter per gram.

EXAMPLE 7

In the run for this example, 250 grams of benzene were admixed with 98 grams of maleic anhydride, 280 grams of 1-decene and 2.42 grams of benzoyl peroxide and heated at 80° C. for 24 hours. The product was poured into a large quantity of isopropanol to form a precipitate which was filtered and dried at 50° C. The yield of copolymer was 210 grams.

Resort may be had to such variations and modifications as fall within the spirit of the invention and the scope of the appended claims.

I claim:

1. A process for the preparation of copolymers of maleic anhydride and an aliphatic olefin having from 6 to 10 carbon atoms in a finely divided filterable solid form which comprises:
   copolymerizing maleic anhydride and at least one of said olefins in the presence of a free-radical catalyst and a solvent for the maleic anhydride, said aliphatic olefin and the resulting copolymer selected from the group consisting of a liquid saturated hydrocarbon having from 6 to 20 carbon atoms, a liquid aromatic hydrocarbon having from 6 to 20 carbon atoms and a ketone having from 3 to 6 carbon atoms; and
   thereafter adding said copolymer product while in solution to a monohydroxy aliphatic alcohol having from 1 to 4 carbon atoms with agitation, the amount of said alcohol being sufficient and the rate of addition of said copolymer solution to said alcohol being such as to result in precipitation of the copolymer in a particulate solid form.

2. A process according to claim 1 wherein the weight ratio of alcohol to solvent exceeds 1:1.

3. A process according to claim 1 wherein the aliphatic alcohol has from 1 to 3 carbon atoms.

4. A process according to claim 3 wherein the olefin has from 6 to 8 carbon atoms.

5. A process according to claim 4 wherein the aliphatic alpha-olefin is 1-hexene.

6. A process according to claim 1 wherein the free-radical catalyst is a peroxide and the copolymerization occurs at a temperature from 20° C. to 200° C.

7. A process according to claim 6 wherein the weight ratio of alcohol to solvent in the precipitation zone is from 1:1 to 100:1.

8. A process according to claim 1 wherein the solvent is a ketone having from 3 to 6 carbon atoms.

9. A process according to claim 1 wherein the solvent is a liquid aromatic hydrocarbon having from 6 to 20 carbon atoms.

10. A process for the preparation of a copolymer of maleic anhydride and decene in a finely divided filterable solid form which comprises:
    copolymerizing maleic anhydride and decene in the presence of a free-radical catalyst and a solvent for the maleic anhydride, said decene and the resulting copolymer; and
    thereafter adding said copolymer product while in solution to a monohydroxy aliphatic alcohol having from 1 to 4 carbon atoms with agitation, the amount of said alcohol being sufficient and the rate of addition of said copolymer solution to said alcohol being such as to result in precipitation of the copolymer in a particulate solid form.

11. A process in accordance with claim 10 wherein said solvent is a saturated dihalogenated hydrocarbon having from 1 to 5 carbon atoms per molecule.

12. A process in accordance with claim 11 wherein the solvent is 1,1-dichloroethane.

13. A process in accordance with claim 10 wherein the solvent is a liquid aromatic hydrocarbon having from 6 to 20 carbon atoms per molecule.

14. A process in accordance with claim 13 wherein the solvent is benzene.

References Cited

UNITED STATES PATENTS 3,580,893    5/1971    Heilman _____ 260—78.5 T
3,461,108    8/1969    Heilman et al. _____ 260—78.5

HARRY WONG, Jr., Primary Examiner

J. KIGHT III, Assistant Examiner

U.S. Cl. X.R.

260—32.8 A, 33.6 PQ, 33.8 R, 78.5 T

PO-1050
(5/69)

UNITED STATES PATENT OFFICE
CERTIFICATE OF CORRECTION

Patent No. 3,706,704     Dated December 19, 1972

Inventor(s) William J. Heilman

It is certified that error appears in the above-identified patent and that said Letters Patent are hereby corrected as shown below:

Col. 4, line 28 - "three to five carbon atoms" should read --three to six carbon atoms--.
(See Amendment dated January 24, 1972)

Signed and sealed this 22nd day of May 1973.

(SEAL)
Attest:

EDWARD M. FLETCHER, JR.            ROBERT GOTTSCHALK
Attesting Officer                  Commissioner of Patents